J. F. STEWARD.
TRACTION ENGINE.
APPLICATION FILED JAN. 14, 1914.
1,133,758.
Patented Mar. 30, 1915.
2 SHEETS—SHEET 1.
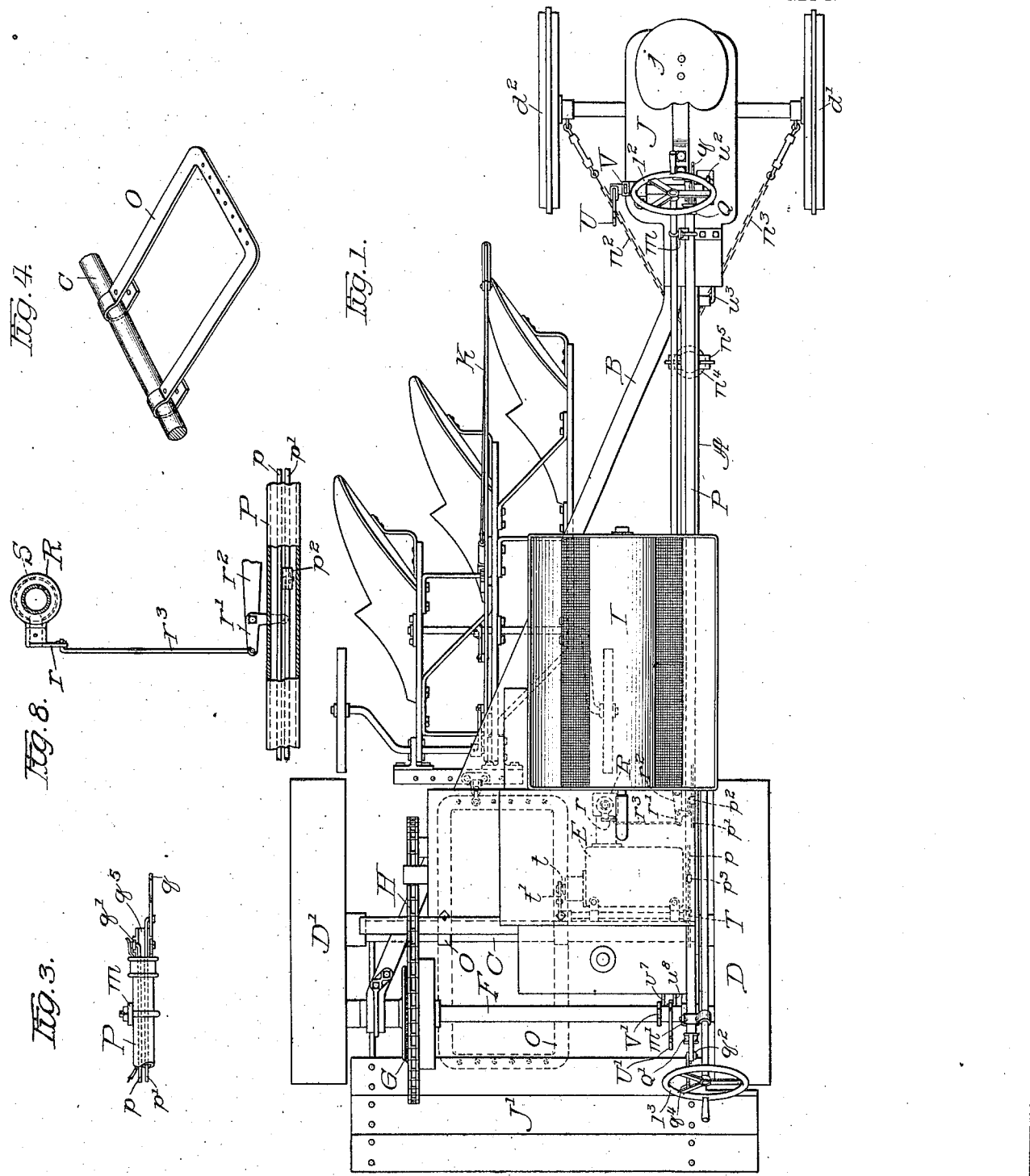

J. F. STEWARD.
TRACTION ENGINE.
APPLICATION FILED JAN. 14, 1914.
1,133,758.
Patented Mar. 30, 1915.
2 SHEETS—SHEET 2.
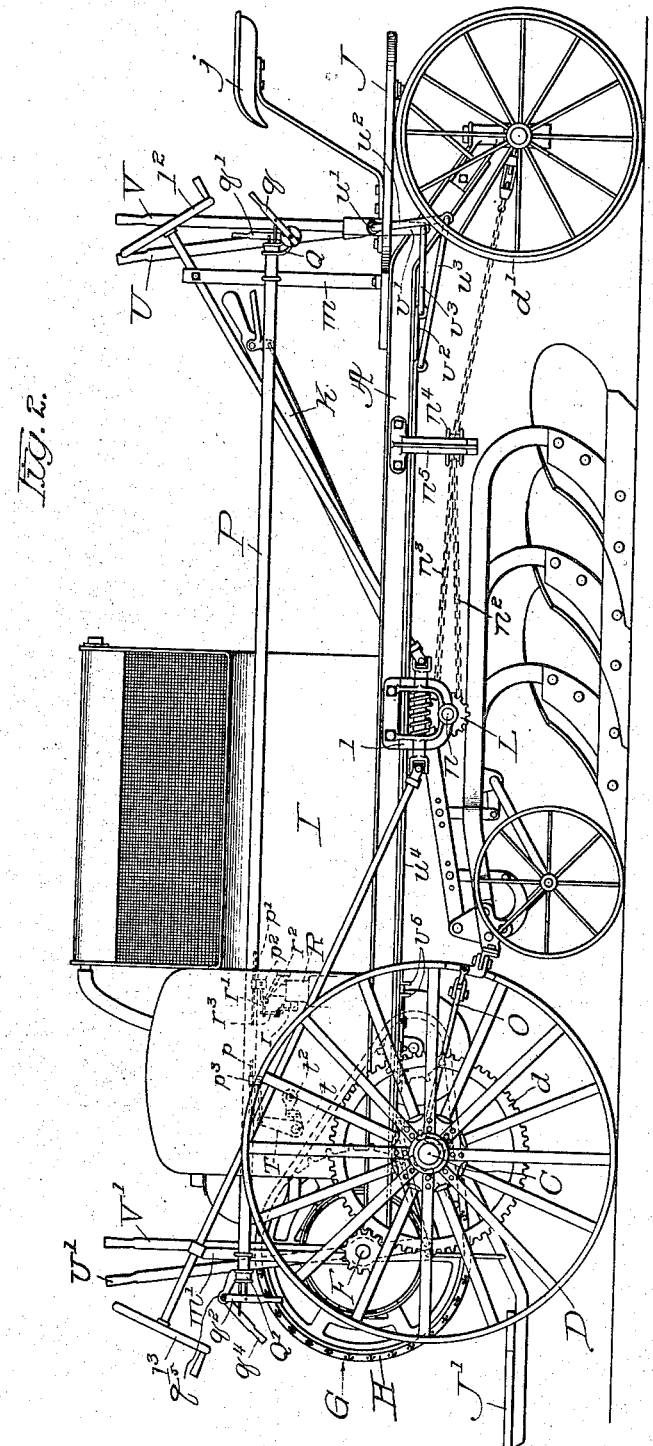
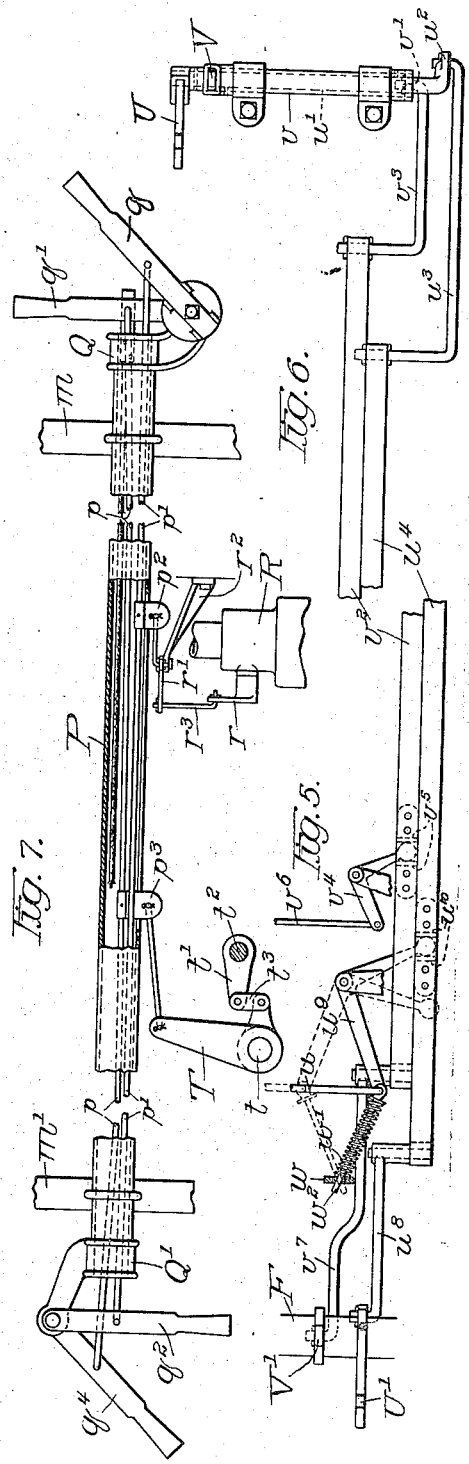
Witnesses:
O. B. Peterson
D. E. Lockert
Inventor.
John F. Steward.

UNITED STATES PATENT OFFICE.

JOHN F. STEWARD, OF CHICAGO, ILLINOIS, ASSIGNOR TO INTERNATIONAL HARVESTER CORPORATION, A CORPORATION OF NEW JERSEY.

TRACTION-ENGINE.

1,133,758. Specification of Letters Patent. Patented Mar. 30, 1915.

Application filed January 14, 1914. Serial No. 811,982.

*To all whom it may concern:*

Be it known that I, JOHN F. STEWARD, a citizen of the United States, residing at Chicago, in the county of Cook and State of Illinois, have invented certain new and useful Improvements in Traction-Engines, preferably of the internal-combustion type, of which the following is a full description, reference being had to the accompanying drawings, in which—

Figure 1 is a general plan view showing the position of the plows when the traction engine is moving with its traction wheels forward, and various details; Fig. 2 is a side elevation, as viewed from the left side, when the traction engine is moving with its traction wheels forward; Figs. 3, 4, 5, 6, 7 and 8 are details showing means for putting into effect the various requirements for a traction engine designed to be operated at either of its ends.

The object of my invention is particularly to provide a tractor (that is, a vehicle moved by an internal combustion engine) that can be controlled by the operator when situated at either end of the same. In order to do so I provide an operator's stand at each end of the tractor and provide duplex means for purposes of control. To better adapt the tractor for receiving the plows in proper position relative to the line of advance, I make the main frame V-shaped, the main bar A, however, parallel with the line of advance, and the bar B departing therefrom at a considerable angle, the bars being securely bolted at their meeting ends and supported on the axle C by any suitable brackets (not shown).

D and $D^1$ are the traction wheels, each provided with a gear $d$.

E may be considered the engine, suitably geared to the differential shaft F, on which I place the differential gearing G, in this instance indirectly given motion by the chain H, from the engine transmission gears (not shown, as they form no part of the invention here exemplified).

I may be considered to represent any form of cooling tank.

Coming, now, to the invention proper, J and $J^1$ are the operator's platforms, J being suitably supported on the joined ends of main beams A and B and, preferably, provided with the seat $j$, the platform $J^1$ being suspended from the axle and beams of the frame by the bars and rods.

K is the lever for controlling the depth of the furrows being made by the plows.

L is a worm wheel suitably supported in brackets $l$, and upon the steering shafts knuckled to the worm shaft.

$l^2$ and $l^3$ are the steering wheels. The higher ends of the steering shafts are supported by the upreaching bars $m$ and $m^1$.

The worm wheel L is secured to a small shaft $n$, journaled in the bracket $l$. Secured to the worm wheel, and revolving therewith, is a small drum, of the usual kind, around which the steering chains $n^2$ and $n^3$ are wrapped, the two ends of the latter secured to the vertically pivoted steering wheel axle, supported by the wheels $d^1$ and $d^2$, in the usual manner.

$n^4$ is a sheave journaled on a bracket $n^5$, the sheave serving merely as a guide for the chains, where they cross. It is thus seen that the operator may control the steering devices at either position he may place himself.

O is a yoke hooked to the axle, as shown in Fig. 4, to which the plow frame is flexibly secured. The yoke is adapted to be swung to the two positions shown in Fig. 1, the position for the plows, as shown in that figure, being represented by full lines. As shown by dotted lines, the position is suitable for pulling seeders, disk harrows and similar farm tools.

Coming now to the controlling devices: As slight rods passing from end to end of the tractor only are necessary, I provide the pipe P, shown in most of the figures, and within it place the rods $p$ and $p^1$. To the rod $p$ I secure the plate $p^3$, and to the rod $p^1$ I secure the plate $p^2$. These plates are merely provided as convenient means for attaching the magneto and throttle of the fuel pipe to the rods. The pipe P is supported at its ends by the standards $m$ and $m^1$. Upon the ends of the pipe are the brackets Q and $Q^1$, for the support of the levers $q$, $q^1$, $q^2$ and $q^4$.

$q^5$ are pivots to which the last named levers are secured, consisting of plates spring-held to the bracket Q, merely to hold the levers in any desired position of adjustment. The plates may be ratchet faced, if desired. In the side elevation, Fig. 7, the carbureter of the internal combustion engine is shown as R, having a butterfly valve S, Fig. 8.

$r$ is an upwardly extending arm secured to the shaft of the butterfly valve, and $r^1$ is a horizontally placed bell crank pivoted on the suitably supported arm $r^2$. Connecting the bell crank $r^1$ and the upreaching arm $r$ is the link $r^3$. It is thus seen that by movement of either the lever $q$ or $q^2$, the throttle may be regulated.

T is a bell crank pivoted at $t$ to any suitable part of the engine, and $t^2$ the rock shaft for controlling the time of the spark produced by the magneto, having the arm $t^1$ secured thereto, and the link $t^3$ connects the arm to one arm of the bell crank. It is thus seen that the movement of either the lever $q^1$ or $q^4$ controls the time of ignition.

Adjacent to the operator's stand, at each end of the tractor, are placed the levers U, $U^1$, V and $V^1$ for controlling the clutch of the transmitting gearing and the shifting gear of the same, neither of which is shown, as any form now in use for each may be resorted to. Suffice it in this case to say $u$ may be considered to be the rod that slides a gear of any form of transmission chosen, for reversing the direction of travel of the tractor. $u^4$ is a flat bar lying and suitably sustained beneath the bar A of the main frame.

U is an upreaching lever secured to the rock shaft $u^1$, shown by dotted lines in Fig. 6, passing through a tube which serves as another rock shaft, soon to be described.

$u^2$ is a downreaching arm on the rock shaft $u^1$, having connected thereto the link $u^3$, serving as a connection between the lever arm $u^2$ and the bar $u^4$. By means of these parts the bar $u^4$ is moved longitudinally. In order that the bar $u^4$ may be controlled from either position occupied by the operator, a lever $U^1$ is also provided, for convenience pivoted on and around one of the bearings of the differential shaft F. This lever is also connected to the bar $u^4$ by means of the link $u^8$. Pivoted on a suitable bracket, secured to the main frame bar A, is the bell crank $u^9$.

$u^{10}$ are clips secured to the bar $u^4$, between which rests one arm of the bell crank $u^9$. To the other arm of the bell crank is connected the rod $u$. It is thus seen that by the use of the levers U and $U^1$ the gear moving rod $u$ may be moved longitudinally in either direction.

V and $V^1$ are levers situated adjacent to each of the operator's positions, the upreaching lever being secured to the tubular rock shaft $v$ and the downwardly reaching arm $v^1$ connected to the bar $v^2$ by means of the link $v^3$. As in the case of the lever $U^1$, the lever $V^1$ is preferably pivoted on and around the bearing of the differential shaft F, and its short downreaching arm connected to the bar $v^2$ by means of the short arm $v^1$ of the lever V. Also pivoted to a suitable bracket on the bar A is the bell crank $v^4$, one arm resting between the clips $v^5$ on the bar $v^2$, and to the other arm of the bell crank is connected the rod $v^6$, which, in this instance, may be considered to shift any form of clutch.

$w$ may be considered to be a lug on any suitable part of the framework to sustain the spring-supporting rod $w^2$, and also to serve as an abutment against which the spring $w^1$ presses. The other end of the spring $w^1$ rests against a collar on the rod, and the rod is preferably pivoted around the down-turned end of the rod $u$. As shown in Fig. 5, the pressure of the spring $w^1$ is exerted to hold the bell crank $u^9$ in the position there seen. When the other extreme movement of the bell crank $u^9$ is reached, as shown by dotted lines in Fig. 5, the spring also holds it in position.

What I claim as my invention, and desire to secure by Letters Patent, is:

1. In an internal combustion engine tractor, in combination, a carbureter and means for regulating it, means for producing an electric igniting spark and means for timing the same, all of these means properly housed, and means for controlling the direction of travel of said tractor, said means lying beneath the sill of the frame all of said devices controllable at either end of the tractor.

2. In an internal combustion engine tractor, in combination, a main supporting frame having operator's stands at each end, a carbureter and means for controlling the same, a spark producing element, means for controlling the time of ignition, said means properly housed, transmission gearing connecting the engine to the traction wheel, a clutch, and means adjacent to said operator's stand to control all of the elements mentioned, said last mentioned means consisting of rods lying beneath the sill of the frame.

3. In an internal combustion engine tractor, in combination, a main frame supported on traction wheels, an operator's stand at each end of the tractor frame, means for controlling the engine, and means for reversing the direction of travel of said tractor, all means lying beneath the sill of the frame and controllable by means adjacent to the operator's stands.

4. In a tractor, in combination, a main frame supported on traction wheels, an engine for propelling the tractor suitably connected to the engine, controlling means at each end of the tractor, and a reversible yoke secured to the tractor whereby the yoke can be swung to pull implements in the direction of travel, as controlled by the operator, when at his place at either end of the tractor.

5. In a tractor, in combination, a Y-shaped frame consisting of a longitudinal element, A, and an element, B, united thereto, an operator's platform mounted substantially in the line of the longitudinal element of the frame, a clutch lever and lever for changing the direction of movement of the tractor adjacent to the operator's seat, and a lever suitably connected to rods passing forwardly substantially parallel with the longitudinal member of the main frame and by suitable means connected to the clutch device and to the gearing for controlling the direction of movement of the tractor.

6. In a tractor, in combination, a Y-shaped frame consisting of a longitudinal element, A, and an element, B, united thereto, an operator's platform mounted substantially in the line of the longitudinal element of the frame, a clutch lever and lever for changing the direction of movement of the tractor adjacent to the operator's seat, and a lever suitably connected to rods passing forwardly beneath the longitudinal member of the main frame and by suitable means connected to the clutch device and to the gearing for controlling the direction of movement of the tractor.

7. In a tractor, in combination, a main frame, an operator's stand at each end thereof, levers at each end adjacent to the operator's stand, a clutch and shifting gears to change the direction of movement of the tractor, sliding bars beneath one of the main sills adapted to operate the clutch and shifting gears, said bars suitably connected to the controlling levers at each end of the tractor.

8. In a tractor, in combination, a Y-shaped main frame consisting of a longitudinal element, A, and an element, B, united thereto, an operator's stand at each end of the tractor, a clutch lever and a lever for changing the direction of movement of the tractor adjacent to the operator's stand, parallel sliding bars beneath said longitudinal element and suitably connected to said levers and suitably connected to the clutch and gear shifting mechanisms.

JOHN F. STEWARD.

Witnesses:
O. B. PETERSON,
D. E. LOCKERT.